May 4, 1943.   L. L. SCHAUER ET AL   2,318,335
SPINDLE CONTROL FOR DRILLING AND TAPPING MACHINES
Filed Feb. 8, 1936   2 Sheets-Sheet 1

INVENTORS
Lawrence L. Schauer
John H. McKiven
BY
Albert F. Nathan
ATTORNEY

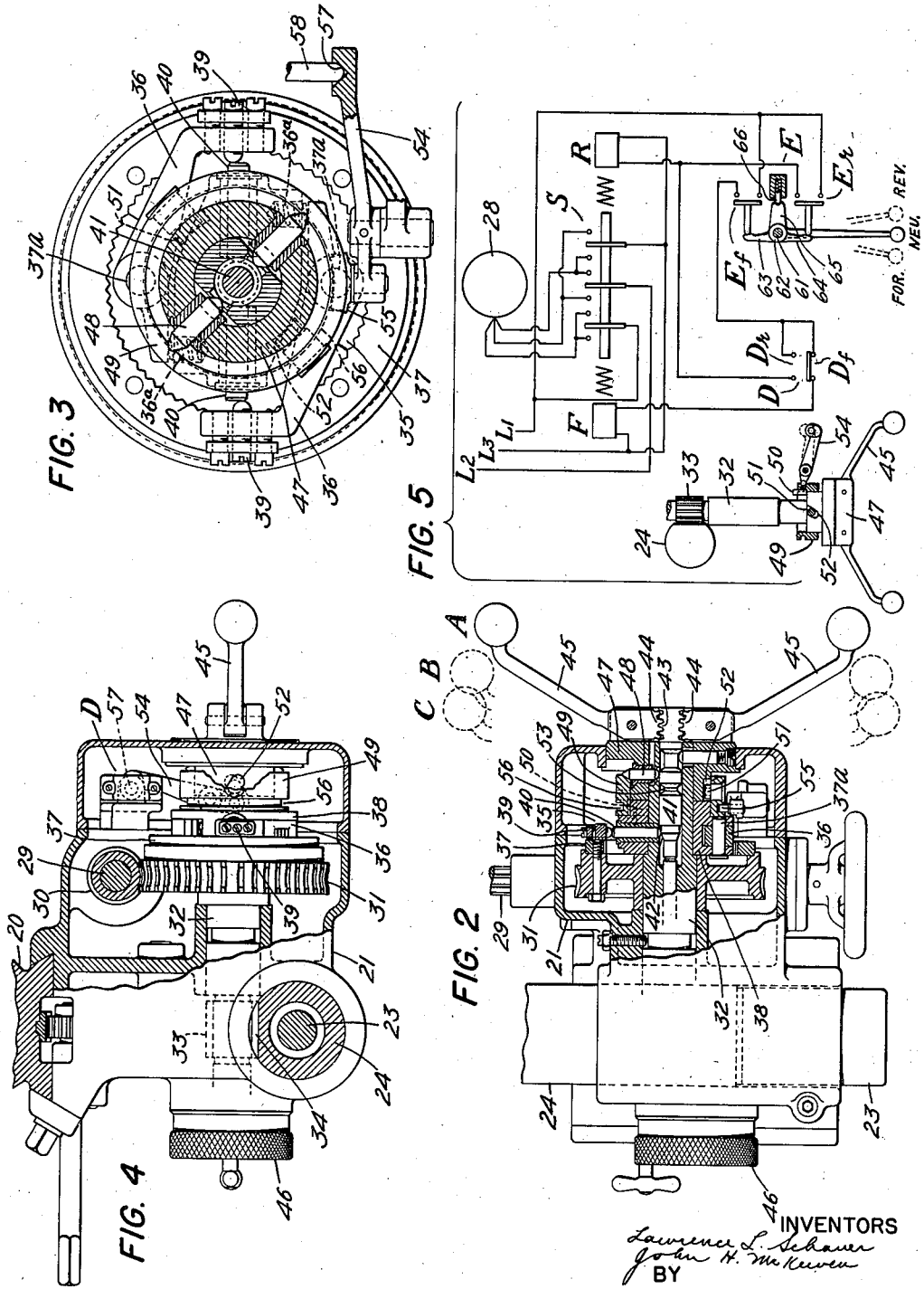

Patented May 4, 1943

2,318,335

UNITED STATES PATENT OFFICE 2,318,335

SPINDLE CONTROL FOR DRILLING AND TAPPING MACHINES

Lawrence L. Schauer, Wyoming, and John H. McKewen, Cincinnati, Ohio, assignors to The Cincinnati Bickford Tool Company, Cincinnati, Ohio, a corporation of Ohio Application February 8, 1936, Serial No. 63,003

14 Claims. (Cl. 10—136)

The present invention relates in general to drilling and tapping machine tools and particularly to an improved method and means for controlling rotary as well as translatory movements of the spindles of such machines from a single control lever.

The invention is applicable to drilling machine tools of the radial, upright or sensitive type, and in fact any machine that is adapted for thread cutting operations and in which the axial or translatory movement of the tool relative to the workpiece is effected manually or by power through or under control of a common control element.

In the prior machines the rotary movements of the tool spindle were controlled by an independently operated clutch mechanism or reversing mechanism which necessitated not only the use of additional mechanism and control instrumentalities, but of an expenditure of an appreciable amount of effort upon the part of the operator each time the spindle was started or reversed. In production tapping operations, for example, the extra control lever required additional operating movements, increased operating fatigue and resulted in a relatively low machine output.

A primary aim of the present invention is to eliminate the need for the reversing mechanisms and associated controls heretofore used, and to control the rotary motions of the spindle by the same lever or instrumentality that controls the translatory movements, with the ends in view of eliminating extra operating movements and of simplifying the operation of the machine.

A further object of the present invention is to simplify the control of the rotary and translatory movements of the tool relative to the work, to avoid confusion and mis-timing of the several motions, and to render available a machine electively inherently capable of being operated in the conventional manner through and under control of a plurality of levers, or through and under control of a single lever.

As an additional refinement the invention aims to coordinate the controls for all of the operating motions in a single lever and to so arrange the parts that the direction of movement of the lever is indicative of the direction of translation and of rotation of the tool or work as the case may be.

Still another objective of this invention is to improve and perfect the timing of the resulting motions relative to each other. For example, in tapping operations it is very important that the tap be rotating before it is fed into the hole. Likewise, in backing the tap out of the hole, a reversal in rotation should occur before or at least simultaneously with the reverse in translation, otherwise the threads of the tap or tapped hole would be stripped in the operation. The present invention aims to correlate the timing of these various motions in a semi-positive manner to insure proper sequence in their operation and without the aid of additional or auxiliary interlocking devices.

The invention is disclosed herein in connection with an upright drilling machine but it will be understood that the invention lends itself equally well to other types of machines and the one herein disclosed is for illustrative purposes only.

Machines of this type are customarily provided with one or more hand levers connected directly to the spindle feed pinion shaft, so arranged that angular movement of the levers propels the spindles up or down. Usually a power feed clutch is provided and operable from those same levers, for the purpose of connecting the feed pinion shaft with a source of power whereby the spindle is propelled axially by power. The starting, stopping, and reversing of the spindle has heretofore been controlled by a separate lever. This necessarily meant that an operator had to have his hands on two levers during tapping operations and to be absolutely certain that each was operated in the proper sequence.

The present invention aims to incorporate in the usual quick traverse levers the functions and controls heretofore carried out thru the auxiliary lever, thereby to enable the operator to exercise full control over all movements with a single lever. The spindle or spindles of a machine so equipped may be with the aid of this invention controlled by one hand, thus leaving the operator's other hand free to expeditiously locate the workpiece or the tool relative to each other for the particular operation to be performed and to repeat such operations in rapid succession.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings represents the upper portion of an upright drill embodying the present invention, the conventional table and base of the machine being omitted.

Fig. 2 is a fragmentary view of a portion of the spindle head partly in section.

Fig. 3 is a vertical section through certain elements of the switch operating mechanism.

Fig. 4 is a horizontal sectional view through a portion of the spindle head.

Fig. 5 is a diagrammatic drawing of the electrical circuit and its controlling instrumentalities.

Figure 6:
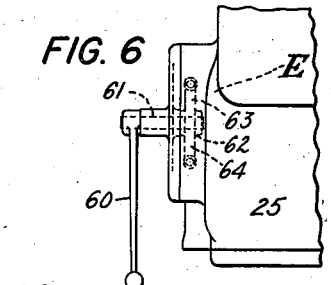
Fig. 6 is a fragmentary view of a portion of the control.
Figure 1:
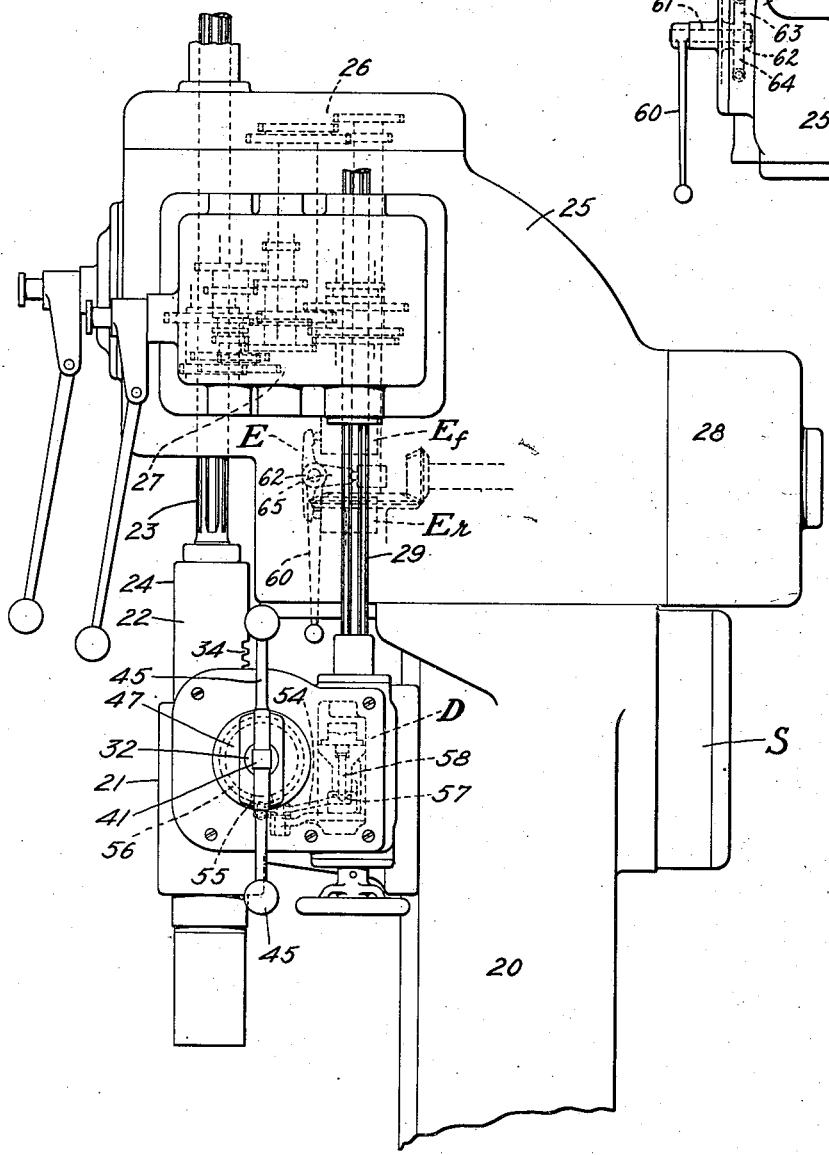

In Fig. 1 of the drawings the invention is disclosed embodied in an upright drilling machine of the general type as the machine disclosed in Patents Nos. 2,022,436, and 2,022,437, to which reference may be made for a fuller detailed description. Suffice it for the present purposes to state that the machine comprises an upright standard 20, upon which is mounted for vertical adjustment, a spindle bracket 21. The spindle assembly 22 has a definite range of movement in the bracket 21, but the position of that range of movement may be changed to accommodate various classes of work by adjusting the position of the bracket on the column 20.

The upper end of the spindle 23 projects into an upper housing 25, within which are housed the change gears 26 for spindle speeds and change gears 27 for spindle power feeds, both serially arranged and deriving power from a reversible prime mower 28. Normally, the spindle power feed is taken off the spindle itself in order to maintain a definite selected ratio between speed and feed irrespective of the rate of spindle speed. The splined shaft 29 is the ultimate feed shaft and carries at its lower end a worm gear 30 that meshes with the worm wheel 31 rotatively mounted upon a feed pinion shaft 32. The shaft 32 is provided intermediate its ends with a pinion 33 which constantly meshes with rack teeth 34 carried upon the spindle sleeve 24, and thus when the clutch 35 is effective to connect the worm wheel 31 with the shaft 32 the spindle assembly is propelled axially by power.

Figs. 2 and 3, illustrate more clearly the construction of the clutch mechanism, which comprises two clutch levers 36, normally spring pressed, by springs 36ᵃ, out of engagement with an internally toothed clutch ring 37. Each lever is pivoted at 37a to a spool 38, and is provided at its outer end with adjusting pins 39. The pins 39, in turn, bear against radially disposed actuating pins 40 carried by the spool 38. The inner ends of the pins 40 engage an axially movable centrally located trip-shaft 41 which is provided with a cam surface 42 thereon for actuating the clutch pins.

The shaft 41 extends to the front of the bracket 21 and is provided with rack teeth 43 which coact with gear segments 44 on the pivoted quick traverse levers 45. In and out movement of the levers thus shifts the shaft 41, which in turn, renders the power feed clutch effective or ineffective.

The shaft 41 also forms part of an automatic tripping mechanism located within the housing 46 which includes adjustable and non-adjustable trip-dogs driven by and synchronously with the feed pinion shaft 32. By properly setting the dogs the shaft 41 may be actuated to the right from the position illustrated and the power feed thrown out at predetermined limits without attention of the operator.

The quick traverse levers 45 are pivoted to a member 47 which has a slight angular float upon the feed pinion shaft 32. Heretofore the quick traverse levers were pivoted directly to the feed pinion shaft or to a member secured fast thereto, so that angular movement of the levers would effect translation of the spindle directly. Because of that direct connection the earlier constructions are not adapted to the needs of the present invention as will presently become clear.

The sleeve like member 47 also carries two radially extending lock-pins 48, the inner ends of which normally ride upon the periphery of the trip shaft 41, while the outer projecting ends engage the face of an axially movable collar member 49. The collar 49 is keyed at 50 to the clutch spool 38 and normally rotates therewith. Sufficient clearance is provided at each side of the pins 48 to permit the slight floating movement above mentioned, to occur between the parts 47 and 32.

The shifting of the collar 49 is occasioned by rollers 51 which track helical grooves 52 in the sleeve member, only when the pins 48 are free to drop into a recess 53 formed in the trip shaft 41. That occurs when the quick traverse levers 45 are actuated inwardly to the position C in the drawings. If the levers are then rotated the helical grooves 52, cam the rollers 51 laterally until the rollers reach the ends of the grooves. During this movement the spindle does not move owing to the drag thereon imposed by its mass and the friction between the parts. At that point of engagement of rollers with the ends of the grooves, the grooves pick up the load of the collar 49, spool 38, and shaft 32 and all parts turn together and the spindle is propelled up or down manually. In the above mentioned position of the quick traverse levers, the clutch pins 40 are on the low part of the trip shaft 41 and consequently the power clutch is disengaged.

When the quick traverse levers 45 are in position B, and rotated, the pins 48 are on the high portion of the trip shaft 41 and the sleeve 49 locked against the shoulder on the clutch spool 38, and a direct connection is established with the pinion shaft 32 with no lost motion. In this position clutch pins 40 are still on the low part of the shaft 41 and the power feed clutch disengaged.

When the quick traverse levers are in position A (full line position) the sleeve 49 is still locked against endwise shift, but clutch pins 40 are projected radially thereby effecting engagement of the power feed clutch and the spindle is propelled by power.

The purpose of the axial shifting movement of the sleeve 49 is to actuate a control switch for the reversible prime mover 28, and a mechanism and electrical circuit for that purpose is as follows: A short lever 54 is pivoted to a stationary part of the housing 21 and is provided at one end with a shoe 55 that tracks a groove 56 in the slider 49. The other end of the lever underlies a two way control switch D, and is provided with a recess 57 within which, one end of a switch actuating plunger 58 normally seats. The other end of the plunger operates the switches Df and Dr of the control switch D. When the slider 49 is locked against axial movement by the pins 48, the switch plunger 58 seats in the recess 57 and switch Df is closed and when the slider 49 is in its other extreme position, the plunger 58 rides upon the surface of the lever 54 and switch Dr is closed.

One side of each of the switches Df and Dr connects with line wire L1 (Fig. 5) and the other side of each switch connects respectively to a forward solenoid F and a reverse solenoid R that forms part of a motor reversing switch S. When the solenoid F is energized the motor and spindle run forward, when solenoid R is energized, the direction is reversed, and when neither is effective, the switch S is in neutral and the motor is stopped.

Assuming that all circuits to the switch D are complete to that point, the mechanism operates during an automatic tapping cycle as follows: The operator grasps the hand lever 45 and moves counterclockwise in Fig. 1; and due to the angularity of the grooves in the head member 47, the initial movement of the lever, urges the slider to the left (in Fig. 2). This movement closes the switch Df and the spindle starts rotating forward. Continued movement of the hand lever 45 propels the spindle downwardly.

When the point is reached where it is desired to reverse the direction of spindle movements, a slight pressure on the hand lever 45 in a clockwise direction, cams the switch D to its other effective position and the motor and spindle run in the reverse direction. Continued movement of the hand lever clockwise, elevates the spindle.

In tapping operations, particularly, the present invention possesses unusual advantages. By its use an operator may tap a plurality of holes in a very short time, merely by placing one hand on the quick traverse lever. That movement propels the tap down and simultaneously starts the spindle turning on the right direction. With but one or two trials, an operator quickly gets the feel of the machine, and this sense of touch enables him to feed the tap into the hole at the proper speed. As soon as the tap takes hold, it feeds itself the rest of the way and the operator thereafter need only watch until the proper depth of thread has been cut and at that instant gives the quick traverse lever a turn in the reverse direction. That movement reverses the rotation of the tap and it feeds itself out of the work. It will be noted that during the up or down movement of the spindle the hand levers 45 always move in the direction of feed and to stop the feed and rotation at any point the operator need only hold the lever stationary and the spindle feed automatically cuts out. An emergency stop at any point may be effected by giving the lever a slight movement in the direction opposite to that which it is moving and the spindle is brought to rest. This result is purposely obtained with the present construction for it is the natural tendency of a user when he wants to stop a moving part, to instinctively hold it back. And it is this "holding back" feature of the invention which gives to it the safety feature.

The present structural embodiment of the invention, furthermore, prevents the breaking of taps in the holes upon reversing. This result is achieved by the lost motion connection between the quick traverse levers 45 and the feed pinion shaft 32 which enables the user to move the levers a slight distance either way from a mid point before a positive connection is made with the pinion shaft. The distance of free swing is in all cases slightly more than that required to throw the reversing switch so that one is assured that the spindle is turning in the proper direction before the lost motion is taken up and the spindle starts moving axially. A direct connection between the quick traverse levers and feed pinion shaft is obviously out of place in a directional control mechanism designed for automatic tapping.

Referring back to the wiring diagram, Fig. 5, it will be observed that the switch D is connected in series with a second control switch Ef. Switch Ef, together with switch Er, make up a dominating control switch E, which in turn is actuated by a hand lever 60 that depends from the upper part of the machine standard.

The purpose and function of the switch E is to effect reversals in spindle rotation when the hand tapping mechanism is locked out of action, and is used primarily for ordinary drilling, whether hand or power feed, or for any other reason or reasons the user may wish to reverse spindle movements. The series relation of the switch D with the "forward" switch Ef of the switch E also gives the operator an additional emergency control but is primarily for the purpose of preventing inconsistent positioning of the two levers, that is, attempting to reverse with one lever while the other lever is in an incompatible position.

In the embodiment disclosed, the connection between the lever 60 and the switch E comprises a short shaft 61 to which is secured a 3-armed lever 62. The arm 63 of the lever engages the switch plunger of the forward switch Ef and the opposed arm 64 engages the reverse switch Er, while the third arm 65 is engaged by suitable detent means 66. Thus, when the lever is moved forward from the neutral position illustrated in Fig. 1, the spindle runs forward and when it is moved backwards from the neutral position, the direction of spindle movement is reversed.

Under normal conditions of use the switch Df is locked closed (except during hand tapping) which completes a portion of the circuit to the forward solenoid F. The operator then has complete control over spindle reversing through the medium of the dominant lever 60. When using the invention for hand tapping however, the lever 60 must be placed in its forward position (switch Ef closed) before the user may control the spindle through the quick traverse levers 45. Switch E is so constituted that the switch Er cannot be closed without first opening switch Ef, thus taking control of the machine away from the quick traverse levers 45. When the lever 60 is in its intermediate position all circuits are broken and the machine is at rest.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A spindle speed and feed control for a machine tool combining, a rotatable and translatable spindle; power means electively available for rotating said spindle selectively in reverse directions; a power feed clutch between said power means and said spindle; a rotatable feed pinion shaft and connections between said shaft and said spindle for translating same; a manually operable lever mounted upon said shaft; a lost motion connection between said lever and said shaft including a member normally movable axially of the shaft upon actuation of said lever angularly; means actuated by the axial movement of said member for rendering said power means operative; and means actuated by said lever for rendering said power feed clutch effective to establish a feed drive between said power means and said spindle.

2. A single lever spindle speed and feed control for a machine tool combining, a rotatable and translatable spindle; power means for rotating said spindle selectively in reverse directions; a feed pinion shaft and connections between said shaft and said spindle for translating the spindle upon rotation of the shaft; a traverse head rotatably mounted upon said shaft; a lost motion connection between said head and said shaft including a member normally movable axially of the shaft upon rotation of said traverse head, said member moving axially in one direction when the head is rotated one way and in the opposite direction when the head is rotated the other way; manually operable means for rotating said traverse head; and means actuated by the axial movement of said member for rendering said power means effective to rotate said spindle selectively in reverse directions in accordance with the direction of rotation of said traverse head.

3. A single lever spindle speed and feed control for a machine tool combining, a rotatable and translatable spindle; power means for rotating said spindle; a feed pinion shaft and connections between said shaft and said spindle for translating same; a traverse head mounted upon said shaft; a lost motion connection between said head and said shaft including a movable member normally movable axially of the shaft upon rotation of said traverse head, manually operable means for rotating said traverse head; and means actuated by the axial movement of said member for rendering said power means effective to rotate said spindle.

4. A control for the rotary movements of a spindle of a machine tool having a lever operative to translate the spindle of the machine electively in a forward or in a reverse direction combining, a reversible prime mover; a non-interruptable drive connection between said mover and the spindle for rotating the spindle; reversing means for said prime mover; a lost motion connection between said lever and said spindle including an axially movable member; means between said member and said reversing means operative to actuate said reversing means upon an initial movement of said lever to a position rendering said prime mover effective to drive said spindle prior to any translatory movement of said spindle imparted by said lever.

5. A control for a power operated threading tool combining, a pivotally mounted and angularly movable control lever and connections between said lever and the threading tool operative to translate the tool in the direction of angular movement of the lever; reversible means for rotating the tool; means actuated by an initial angular movement of said lever rendering said reversible means effective in a direction corresponding to the direction of movement of said lever; a lost motion device in one of said connections normally effective to delay the actuation of its associated mechanism until the other mechanism controlled by said lever starts to function, said lost motion device normally operating to preserve said sequence of movements irrespective of the direction of movement of said lever; and means actuated by a movement of said lever about its said pivot for locking said lost motion device out of action.

6. A drilling machine combining a tool spindle; a manually operable lever for translating said spindle; power means for rotating said spindle; means for starting, stopping and reversing the direction of rotary movement of the spindle selectively, including a set of reversing switches and normally operative direct connections between said switches and said lever; a lost motion connection between said lever and said spindle effective normally to insure actuation of one of said switches by said lever prior to translation of said spindle by said lever; and means actuated by said lever for locking one of said switches in an effective position whereby said lever may be used to translate said spindle in either direction without actuating said switches.

7. A spindle control for a machine tool having a lever operative to translate the spindle of the machine electively forward or in a reverse direction combining, a reversible prime mover; direct connections between said mover and the spindle for rotating the spindle; reversing means effective when actuated to render said prime mover operative selectively in a forward or reverse direction; a lost motion connection between said lever and said spindle including a rotatable and translatable member, said member being translated by the initial movement of said lever and rotated by a further movement of said lever; operative direct acting connections between said translatable member and said reversing means arranged to actuate said reversing means prior to the movement of said spindle by said lever.

8. The combination set forth in claim 7 characterized by the provision of means between said lever and said spindle and between said lever and said reversing means operative automatically to coordinate the direction of rotation with the direction of translation of the spindle upon movement of said lever in a predetermined direction.

9. A drilling machine combining a tool spindle; a manually operable lever for translating said spindle; means for rotating said spindle; means for starting, stopping and reversing the direction of rotary movement of the spindle selectively, including a second lever and operative connections between said second lever and said manually operable lever; a lost motion connection between said manually operable lever and said spindle effective normally to insure actuation of said second lever by said first lever prior to the translation of said spindle by said first lever; and means actuated by said manually operable lever automatically to lock said second lever in a predetermined position and for rendering said lost motion connection inoperative and said manually operable lever operative to effect translation of said spindle directly.

10. An automatically tapping control mechanism for a drilling machine combining a tool spindle; power means for rotating said spindle selectively in reverse directions; a hand lever for translating the spindle; a lost motion connection between said hand lever and the spindle; control means for said driving means; operative direct connections between said lever and said control means, said control means having an operating range of movement not greater than the range of movement permitted by said lost motion connection, the initial movement of said lever thereby functioning to render said spindle driving control means effective to rotate the spindle substantially simultaneously with translatory movement of the spindle imparted through said lever and lost motion connection; and means for eliminating the lost motion between said lever and said spindle whereby said spindle may be translated directly by the said lever.

11. A control for a power rotated threading tool combining, a control lever and connections between said lever and the threading tool operative to translate the tool in the direction of movement of the lever; means for reversing the direction of rotation of the threading tool including electrical switch means; connections between said switch means and said lever operative to actuate said switch means to effect rotation of said tool in the direction of movement of said lever; and a lost motion device comprising an axially movable member operative in one of said connections effective to delay the actuation of its associated mechanism until the other mechanism controlled by said lever starts to function, said lost motion device operating to preserve said sequence of actions irrespective of the direction of movement of said lever.

12. The combination set forth in claim 11 including means actuated by said lever for stopping the rotary and translatory movements of the threading tool simultaneously at any point in the thread cutting operation.

13. A machine tool combining a tool head; a tool spindle rotatably and translatably journaled therein; power means for rotating said spindle; means to render said power means operative to rotate said spindle; power feeding means for said spindle including a power feed clutch; a manually operable lever; connections between said lever and said power rotating means normally operative to effect rotary movement of said spindle when the lever is actuated; and means actuated by said lever for engaging said power feed clutch whereby the spindle is propelled axially by power, said last named means operating in point of time always subsequent to the starting of the rotary movement through and under the control of the said lever.

14. A spindle control for a machine tool having a lever operative to translate the spindle of the machine electively forward or in a reverse direction combining, a reversible prime mover; direct connections between said mover and the spindle for rotating the spindle; reversing means effective when actuated to render said prime mover operative selectively in a forward or reverse direction; a lost motion connection between said lever and said spindle including a rotatable and translatable member, said member being translated by the initial movement of said lever and rotated by a further movement of said lever; operative direct acting connections between said translatable member and said reversing means arranged to actuate said reversing means prior to the movement of said spindle by said lever, and means for eliminating the lost motion between said lever and spindle.

LAWRENCE L. SCHAUER.
JOHN H. McKEWEN.